Patented Jan. 1, 1929.

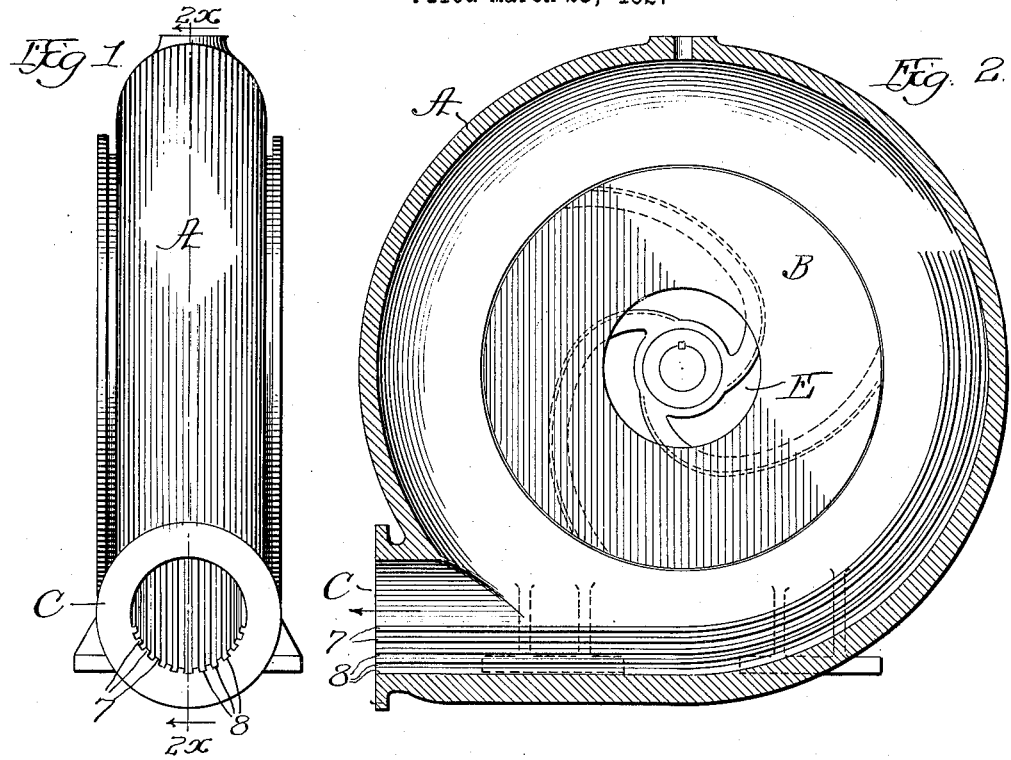
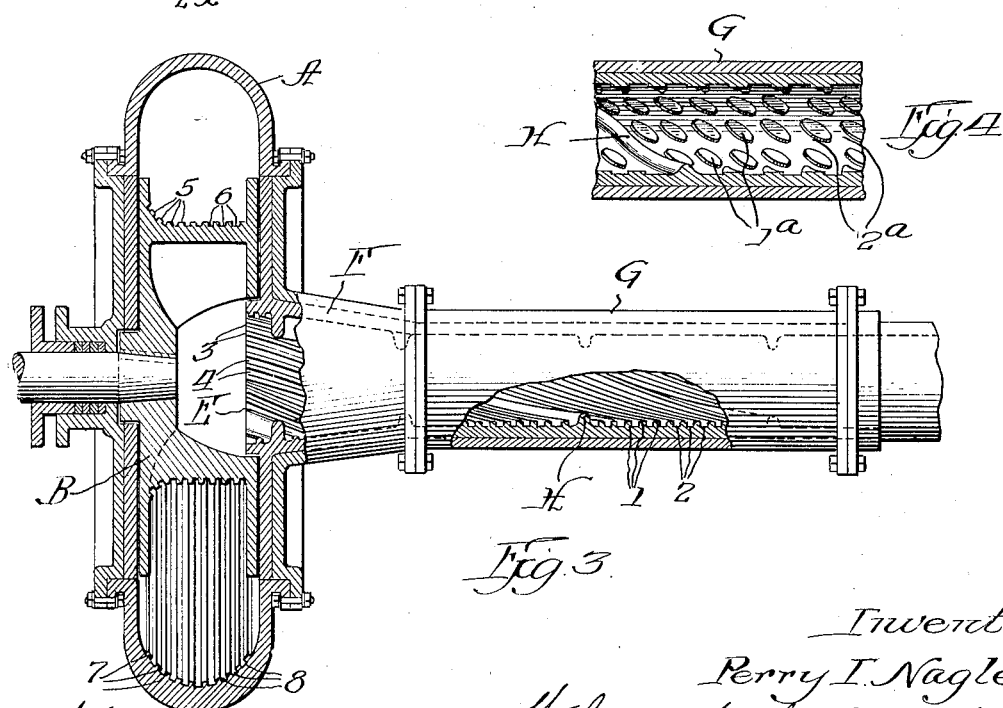

1,697,202

UNITED STATES PATENT OFFICE.

PERRY I. NAGLE, OF CHICAGO HEIGHTS, ILLINOIS, ASSIGNOR TO AMERICAN MANGANESE STEEL COMPANY, OF CHICAGO, ILLINOIS, A CORPORATION OF MAINE.

ROTARY PUMP FOR HANDLING SOLIDS IN SUSPENSION.

Application filed March 28, 1927. Serial No. 178,867.

This invention relates to metallic members, for instance, cast metal conduits, impelling apparatus, or other members designed for confining and transferring solids suspended in liquids, and has for its object to provide a surface construction of such members which will materially reduce the abrasive effect of the solids in their passage over such surfaces.

It is well known that subdivided solids, such as ashes, sand, and gravel, when conveyed in a state of suspension in water used as a vehicle, will by reason of their greater specific gravity travel largely in contact with the surfaces of the members in which they are confined, and tend to wear away by abrasive action certain portions of such members in advance of other portions, and thereby cause considerable waste by necessitating discard of the entire member. These conditions are particularly noticeable in the abrasive action of the solid matter on the intake barrels, rotary impellers, and shells of centrifugal pumps.

The object of the present invention is to greatly reduce abrasive action of solids under the conditions referred to, and this object is attained by causing the vehicular water to intervene between the solids and the surfaces which they tend to attack, so that the solids are cushioned and borne along by the intervening film of water with much less opportunity for impingement against the confining surface. As a means for maintaining the cushioning body of water between the solids and the confining surfaces, the latter are provided with projections which may be either continuous ribs, ridges, or the like, assuming a spiral direction relatively to the axis of flow, or interrupted as studs, such projections being suitably spaced to develop between or among them diminutive troughs or other forms of water spaces or channels also assuming a general spirial direction relatively to the axis of flow into which the solid particles cannot enter, or can enter only with difficulty, and from which the solids will be excluded largely if not wholly by the contact of the solids with the projections.

In order that the invention may be fully understood, two embodiments thereof have been illustrated in the accompanying drawing as applied to a rotary pump of the type in which the barrel leading to the eye of the pump is equipped for inducing vortical action in the inflowing body of vehicular liquid and suspended solids, and in which the present invention is applied to the said barrel, to those surfaces of the rotor with which the solids are liable to contact, and that portion of the inner surface of the shell over which the solids travel.

In said drawing—

Figure 1 is an elevational view of a centrifugal pump as seen from the side of its tangential discharge;

Figure 2 is a vertical section of the pump on the line 2×—2× of Figure 1, the rotor being shown in elevation;

Figure 3 is a vertical axial section of the pump together with an elevational view of its feeding barrel, partly in section; and Figure 4 is a fragmentary view showing a modified form of the invention.

A represents the shell, B the rotor, C the tangential discharge port, and E the intake eye of a rotary pump of known operative principle. The intake eye E is fed through the barrel F and feed pipe G, which latter, for the sake of setting up vortical motion in the fluid prior to reaching the rotor B, is designed with spiral lands or vanes H.

In order to reduce the abrasive action of solids suspended in the vehicular fluid passing through a pump such as that above described, the inner surfaces of the various confines or members with which the solids may contact are developed with a field of closely related projections in the form of upstanding studs or ribs and intervening channels or water spaces. Projections in the form of ribs are shown at 1 and the water spaces in the form of channels at 2, in the feed pipe G; the ribs and intervening channels are shown, respectively, at 3 and 4 in the intake barrel F; they are shown at 5 and 6 in the rotor B; and they are shown at 7 and 8 in the shell A and discharge port C.

As shown in Figure 4, the projections may be interrupted or developed in the form of studs 1ª with intervening water spaces 2ª, developing not only channels in the general direction of flow but cross flow channels as well; the contour of the studs being approximately in conformity with stream lines and having the effect of stirring up and floating solid matter by the constantly changing directions, eddy currents, and agitation of the fluid resulting from contact of the fluid with the sides of the studs. It is to be understood that the form of projections shown in Figure 4 may be applied to any one of the members G, F, E, B, A, and C in spaces occupied by ribs therein.

When solid matter suspended in water flows through the members G, F, E, B, A, and C, the particles of solid matter will impinge so largely upon projection surfaces and the water will be left so free to enter the spaces between the projections that the particles of solid matter will be cushioned or borne out of contact with even the ribs, to a large extent, and the wear upon the confining surfaces will be greatly reduced. The projections 1ª and the ribs 1, 3, 5, and 7 and intervening water spaces or channels 2ª, 2, 4, 6, and 8 will preferably, in each instance, assume the general direction of flow of the liquid, and in applying them to the tubular intake or feed members, where a vortical action is set up, the field of projections and spaces assume a general spiral direction and may extend entirely around such tubular members.

By having solids-supporting ribs on the rotor of a pump extending in the direction of flow of the fluid, that is to say in planes perpendicular to the axis of rotation of the rotor, an advantage accrues which is additional to the advantage of preserving the surfaces from wear, namely, the increased hold which the additional surface takes upon the liquid portion of the mixture and the proportional increase in driving efficiency resulting therefrom; and in making the solids-supporting ribs and grooves, or the flow channels between segregated projections, assume a general spiral direction in a conduit through which a mixture of solids and liquid flows, the flotation effect and resistance to wear are increased by the spreading action of the spirally flowing liquid which tends to resist crowding of the solids, under gravity at the lowest portion of the conduit.

I claim:

1. In a rotary pump for subdivided solids in fluid suspension, an intake member having internal spiral lands for developing vortical action of the mixture, and having its surfaces between the lands constructed with fields of closely related projections developing water spaces between them; said projections being arranged in lines which also assume a spiral direction relatively to the intake member.

2. In a rotary pump, a shell, and a rotor within said shell; said shell and rotor, each having upon their interior surfaces which receive material from the rotor, a series of closely related ribs and water receiving channels lying in planes substantially perpendicular to the axis of rotation of the rotor, and therefore alternating therewith, said ribs and channels extending generally in the direction of flow of material through the shell.

Signed at Chicago Heights, Illinois, this 14th day of March, 1927.

PERRY I. NAGLE.